USOO5626929A

United States Patent [19]
Stevenson

[11] Patent Number: 5,626,929
[45] Date of Patent: May 6, 1997

[54] PEELABLE AND HEAT SEALABLE LIDSTOCK MATERIAL FOR PLASTIC CONTAINERS

[75] Inventor: James A. Stevenson, Pittsburgh, Pa.

[73] Assignee: Aluminum Company of America, Pittsburgh, Pa.

[21] Appl. No.: 476,524

[22] Filed: Jun. 7, 1995

[51] Int. Cl.[6] .................................................. B65D 41/20
[52] U.S. Cl. ...................... 428/35.8; 428/35.7; 428/66.3; 428/344; 428/403; 428/461; 428/463; 428/483; 428/522; 428/523; 428/355 AC; 220/359; 215/232
[58] Field of Search ........................... 220/359; 215/232; 428/35.7, 35.8, 344, 352, 403, 461, 66.3, 41.3, 355, 349, 463, 483, 522, 523

[56] References Cited

U.S. PATENT DOCUMENTS

| | | | |
|---|---|---|---|
| 4,711,673 | 12/1987 | Musselman et al. | 106/287.17 |
| 4,810,541 | 3/1989 | Newman et al. | 428/35.7 |
| 4,857,369 | 8/1989 | Oehlenschlaeger et al. | 428/35.7 |
| 4,916,190 | 4/1990 | Hwo | 525/222 |
| 5,036,140 | 7/1991 | Hwo | 525/222 |
| 5,061,532 | 10/1991 | Yamada | 428/35.7 |
| 5,087,667 | 2/1992 | Hwo | 525/222 |

*Primary Examiner*—Ellis Robinson
*Assistant Examiner*—Chris S. Kyriakou
*Attorney, Agent, or Firm*—Glenn E. Klepac

[57] ABSTRACT

A peelable and heat sealable lidstock material comprises a metal or polymer substrate laminated with a film comprising a mixture of a butene-1 and ethylene copolymer, an ethylene homopolymer or copolymer, an inorganic filler and optionally, a propylene homopolymer or copolymer. The filler makes up at least about 18 wt. % of the mixture and is preferably talc having an average particle size of about 1–2 microns and a carboxylic acid surface coating.

15 Claims, 5 Drawing Sheets

PEELABLE AND HEAT SEALABLE LIDSTOCK MATERIAL FOR PLASTIC CONTAINERS

FIELD OF THE INVENTION

The present invention relates to an improved lidstock useful for making lids on plastic containers.

BACKGROUND

Peelable and heat sealable lids for plastic containers are known in the prior art. However, there is still a need to provide plastic container lids having the following combination of properties: a) approximately constant peel strength over a wide range of heat seal temperatures; b) cohesive failure in the heat seal layer upon peeling; and c) high burst strength in the sealed lid.

A principal objective of the present invention is to provide lidstock for making container lids having the above-mentioned combination of constant peel strength, cohesive failure in the heat seal layer and high burst strength.

A related objective of the invention is to provide lidstock material comprising a substrate laminated with a film comprising a mixture of a butene-1 and ethylene copolymer, an ethylene homopolymer or copolymer, an inorganic filler, and optionally, a propylene homopolymer or copolymer.

Additional objectives and advantages of my invention will become apparent to persons skilled in the art from the following detailed description.

SUMMARY OF THE INVENTION

In accordance with the present invention, there is provided a peelable and heat sealable lidstock material for plastic containers. The container of the invention is suitable for holding foods such as prepared cake frosting, pudding, yogurt, cream cheese and apple sauce; medical devices such as disposable contact lenses; and pharmaceuticals.

As used herein, the term "lidstock material" refers to a metal or polymer substrate laminated with a heat seal layer or film. Lidstock material of the invention is made into food container lids by cutting the material into a desired shape, such as a circular disc.

As used herein, the term "peelable" refers to the capacity of a sealed lid to separate and to release from sealed engagement with its underlying container while each substantially retains its integrity. Such separation and release are generally achieved by a separating force applied manually to outer edge portions of the sealed container.

As used herein the term "heat sealable" refers to the ability to form a bond between a plastic food container and its lid when heat and pressure are applied locally for a sufficient time. The bond is gas-tight and preferably has sufficient burst strength to resist separation from the container.

The lidstock material of the present invention comprises a metal or polymer substrate laminated with a film comprising a polymer mixture. A polymer substrate may be made from biaxially oriented polyethylene terephthate (PET). The substrate is preferably an aluminum foil having a thickness of about 0.25 mil to 3.0 mils (0.00025 inch to 0.003 inch). Aluminum foil is preferred because it provides an excellent barrier against penetration of gases and moisture. In addition, the foil provides protection from ultraviolet light and gives the material an aesthetically pleasing appearance. A particularly preferred aluminum foil substrate has a thickness of about 2.0 mils (0.002 inch).

The aluminum foil substrate is preferably provided with a print primer over the substrate. The print primer facilitates application of printed labeling on the substrate. A particularly preferred print primer has a weight of about 0.7 pound per 3000 square feet.

The heat seal film has a total weight of about 15 to 30 pounds per 3000 square feet. A particularly preferred coating has a weight of about 17 pounds per 3000 square feet of the lidstock material.

The container body preferably comprises a propylene homopolymer. Other suitable plastics for the container body include polyethylene; polyethylene-polypropylene mixtures and polyethylene-polypropylene copolymers.

The film on the lidstock material comprises a mixture of a butene-1 and ethylene copolymer, an ethylene homopolymer or copolymer, an inorganic filler, and optionally, a propylene homopolymer or copolymer.

Some suitable inorganic fillers include talc, amorphous silica and alumina trihydrate. The filler enhances peelability of the coating by shifting seal failure upon peeling from adhesive failure at the container-coating layer interface to cohesive failure in the coating layer itself. The filler comprises at least about 18 wt. % of the coating, preferably about 20–40 wt. %, more preferably about 20–30 wt. % and optimally about 25 wt. %. The filler is preferably a powder having an average particle size of about 0.5–10 microns. Talc having an average particle size of about 1–2 microns is particularly preferred. The talc should be provided with a surface coating comprising about 0.5–5 wt. % of the filler, preferably about 1 wt. %. A carboxylic acid surface coating is particularly preferred.

The carboxylic acid in the surface coating may be a mono or dicarboxylic acid or a mixture of such acids. Some preferred acids include stearic acid and isostearic acid, which is a liquid mixture of mostly $C_{18}$ saturated fatty acids having the general formula $C_{17}H_{35}$ COOH. Other saturated $C_{10}$–$C_{20}$ carboxylic acids or mixtures thereof may also be useful.

The mixture preferably comprises about 30–70 wt. % of a butene-1 and ethylene copolymer wherein ethylene comprises about 1–15 mole percent of the copolymer. More preferably, the copolymer comprises about 30–60 wt. % of the mixture and optimally about 40 wt. %. The ethylene content in the copolymer is preferably about 1–5 mole percent and most preferably about 1–2 mole percent.

The mixture preferably comprises about 10–40 wt. % of an ethylene homopolymer or copolymer, more preferably about 15–40 wt. % and most preferably about 35 wt. %. The ethylene homopolymer or copolymer may be low density polyethylene (LDPE), medium density polyethylene (MDPE), ethylene-vinyl acetate copolymer (EVA), ethylene-methyl acrylate copolymer (EMA), or high density polyethylene (HDPE). Low density polyethylene (LDPE) is particularly preferred.

The mixture optionally may contain about 1–6 wt. % of a propylene homopolymer or copolymer, more preferably about 1–3 wt. %, and most preferably about 1–2 wt. %. A propylene homopolymer is particularly preferred. Propylene-ethylene copolymers are also suitable.

DETAILED DESCRIPTION OF A PREFERRED EMBODIMENT

Figure 1:
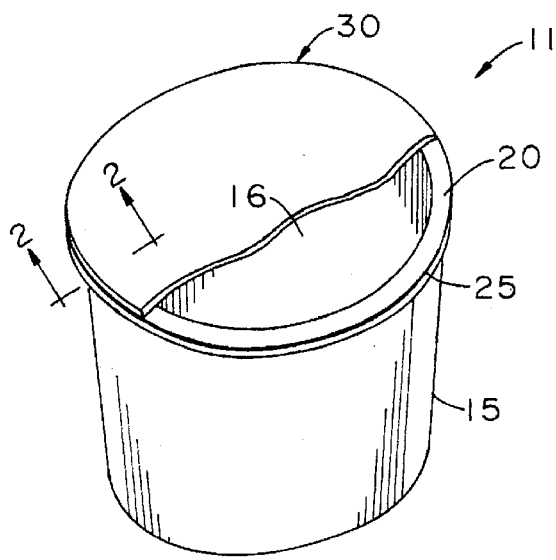
FIG. 1 is a perspective view of a food container made in accordance with the present invention.

There is shown in FIG. 1 a perspective view of a plastic food container 11 made in accordance with the present invention. The container 11 has a body 15 defining a cavity 16 which holds a food product such as a prepared cake frosting, pudding, yogurt, cream cheese or apple sauce. The container is hermetically sealed to prevent contamination by outside agents.

Figure 2:
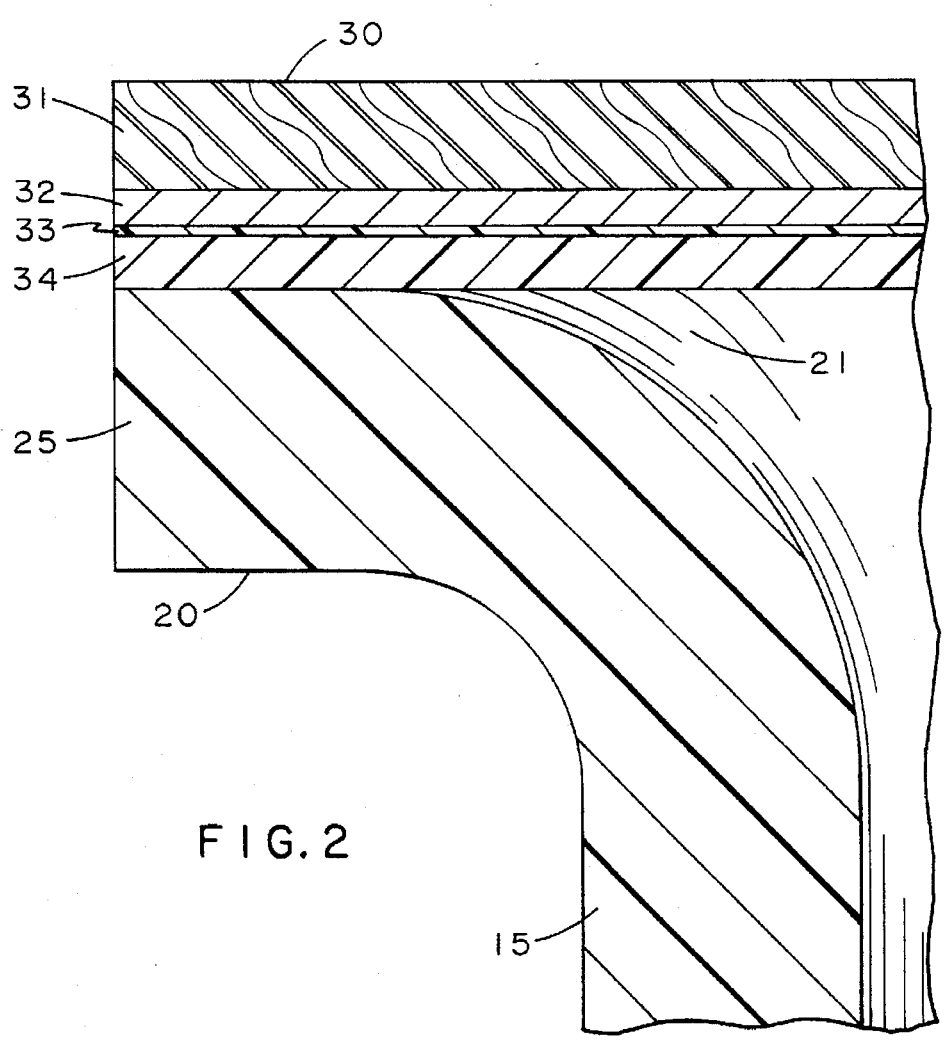
FIG. 2 is an enlarged, fragmentary, cross-sectional view taken along the lines 2—2 of FIG. 1.

Referring now to FIG. 2, it can be seen that the container body 15 has an upper edge 20 defining an opening 21. A peripheral flange 25 extends radially outward from the opening 21. A lid 30 comprises a generally circular disc that is peelably heat sealed to the flange 25.

The lid 30 is made from a lidstock material comprising a print primer 31 over an aluminum foil substrate 32 having a urethane adhesive layer 33 and a film 34 over the adhesive layer 33. The foil 32 has a thickness of about 2.0 mils (0.002 inch). The print primer 31 has a weight of about 0.7 pounds per 3000 square feet. The urethane adhesive 33 has a weight of about 2.4 pounds per 3000 square feet. The film 34 has a thickness of about 1 mil, corresponding to a weight of about 17 pounds per 3000 square feet. As clearly shown in FIG. 2, the lid 30 includes only a single layer of the film 34.

The particularly preferred container 11 shown in FIGS. 1 and 2 has a polypropylene body 15 and a lid 30 laminated with a film 34 having the particularly preferred composition A shown in the Table. Some other preferred compositions (B and C) are also shown in the Table.

| | Film Composition | | |
|---|---|---|---|
| | Amount (wt. %) | | |
| Ingredient | A | B | C |
| Butene-1 and Ethylene Copolymer | 40 | 40 | 60 |
| Low Density Polyethylene | 35 | 0 | 0 |
| High Density Polyethylene | 0 | 35 | 15 |
| Talc | 25 | 25 | 25 |
| TOTAL | 100 | 100 | 100 |

A series of tests were performed on the lidstock material of the present invention. For comparison, a prior art lidstock material having a heat seal layer comprising 90 wt. % ethylene-vinyl acetate copolymer and 10 wt. % talc was also tested. Results of the tests are shown in FIGS. 3–6.

Figure 3:
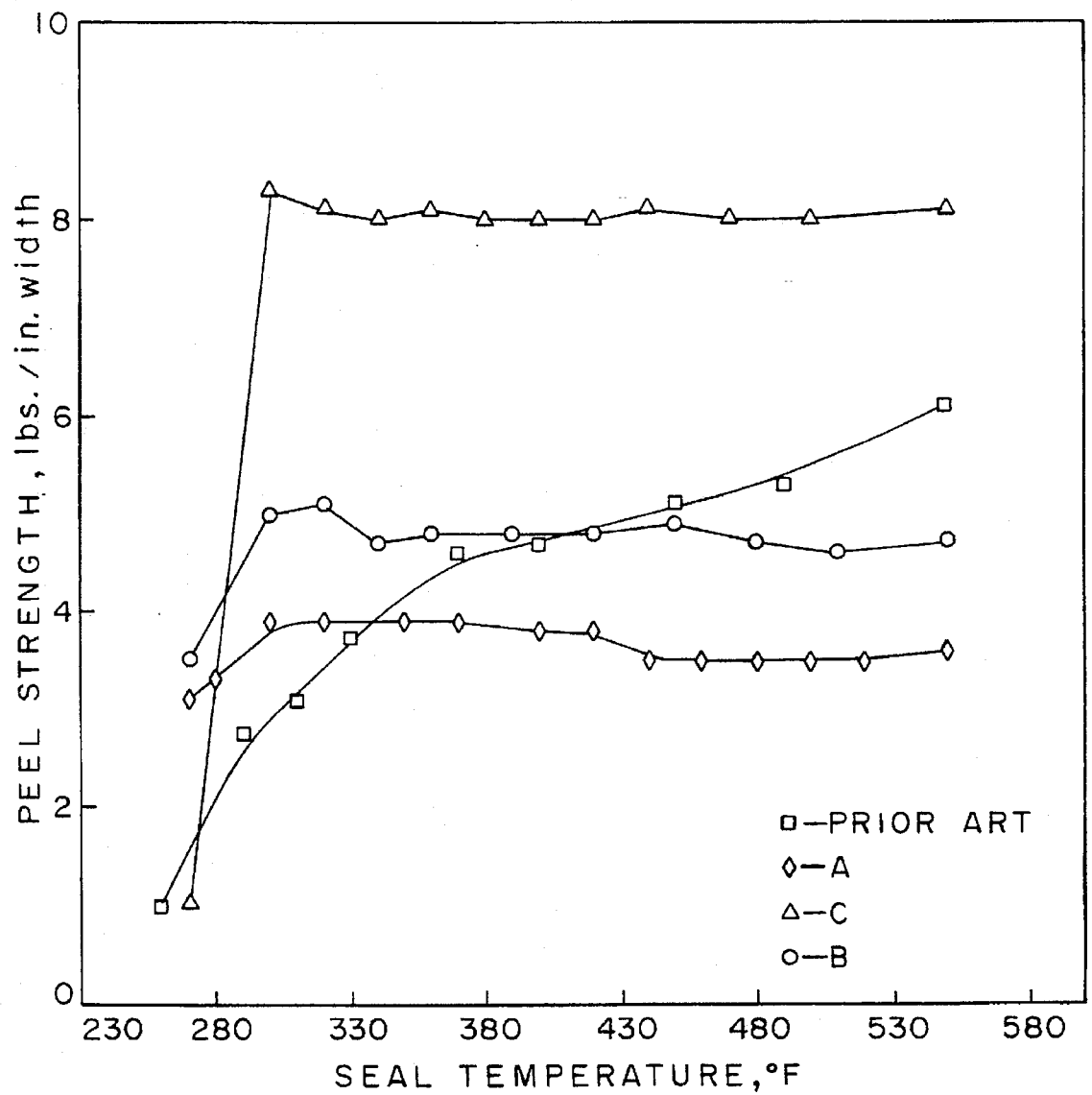
FIG. 3 is a graph showing peel strength as a function of heat seal temperature.
Figure 4:
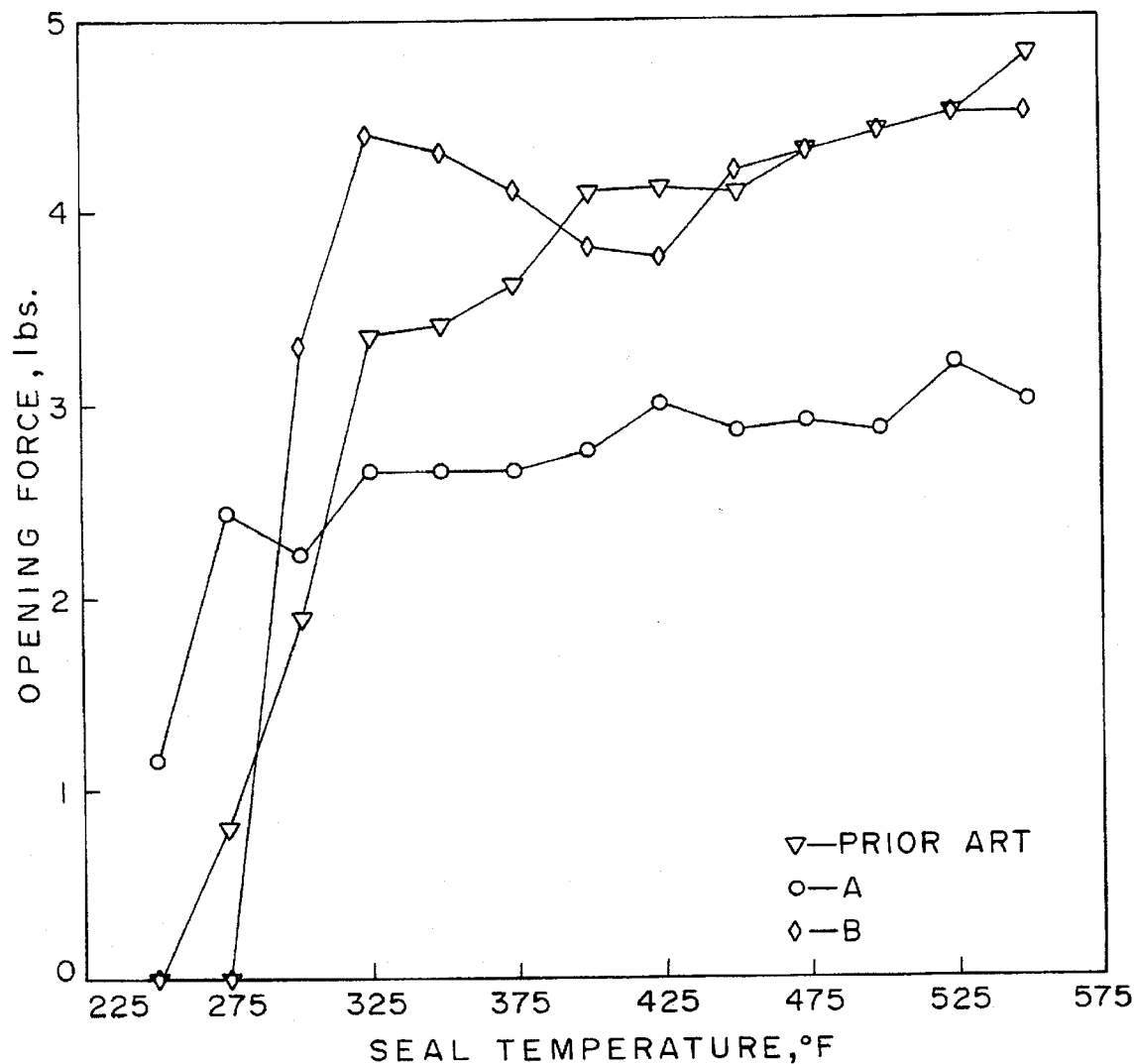
FIG. 4 is a graph showing opening force as a function of heat seal temperature.

Strips of lidstock material having a one inch width were heat sealed to polypropylene homopolymer strips at 40 psi applied pressure. Peel strength was measured on a 90 degree L wheel as a function of heat seal temperature. Results are shown in FIG. 3. The three lidstock material samples of the present invention (A, B, and C) showed constant peel strength over a wide range of heat seal temperatures whereas the prior art sample had a considerable variation in peel strength over the same temperature range.

Samples of lids were heat sealed to 4 ounce polypropylene cups at 40 psi applied pressure with a 0.6 second dwell time. Peel strength at 45° applied force was measured as a function of heat seal temperature. The results are plotted in FIG. 4. Both samples (A and B) made in accordance with the present invention demonstrated a smaller variation in peel strength as a function of heat seal temperature than the prior art sample. In addition, sample A had a lower peel strength over the 325°–550° F. heat seal range than the prior art sample.

Figure 5:
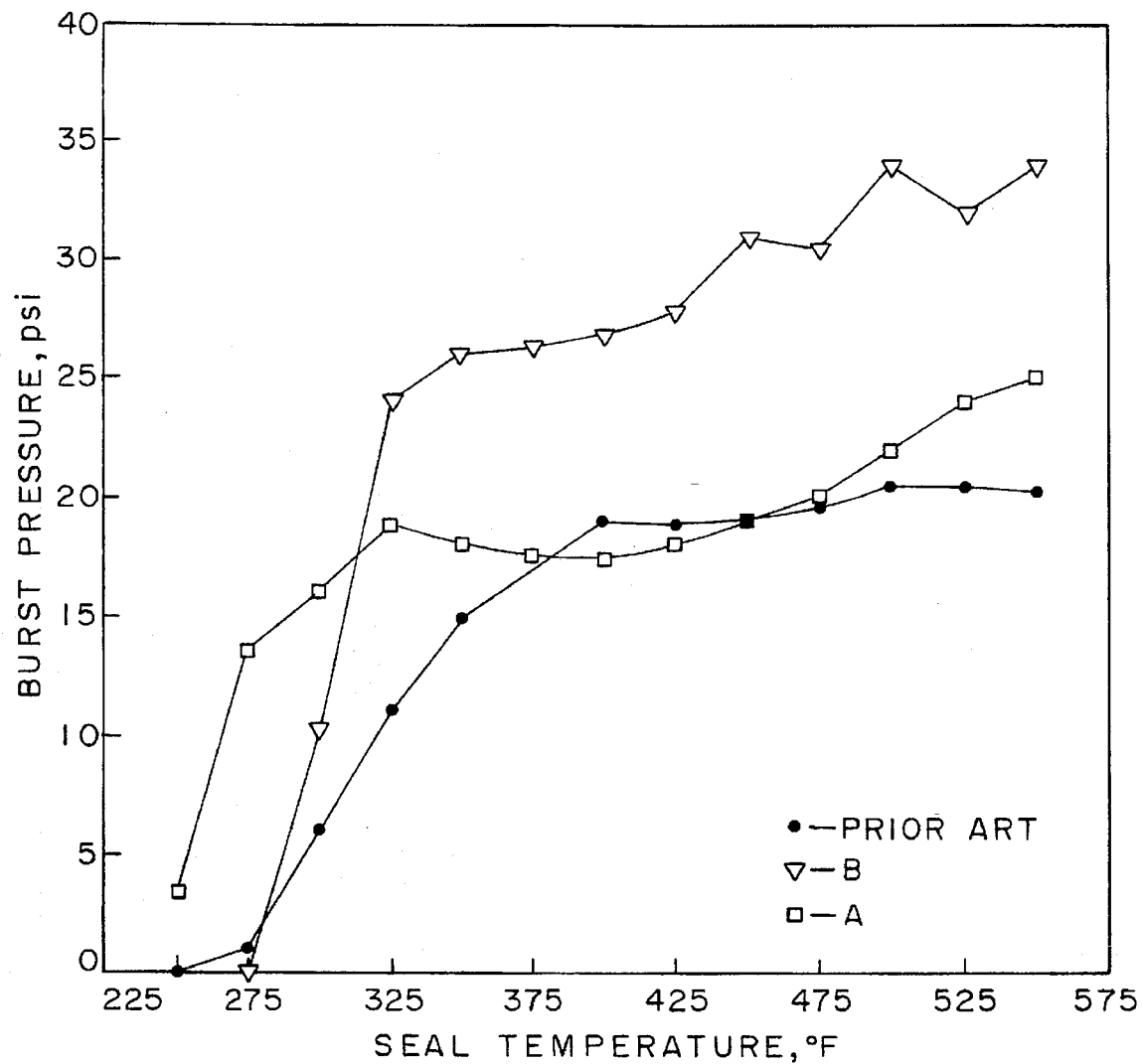
FIG. 5 is a graph showing burst pressure as a function of heat seal temperature.
Figure 6:
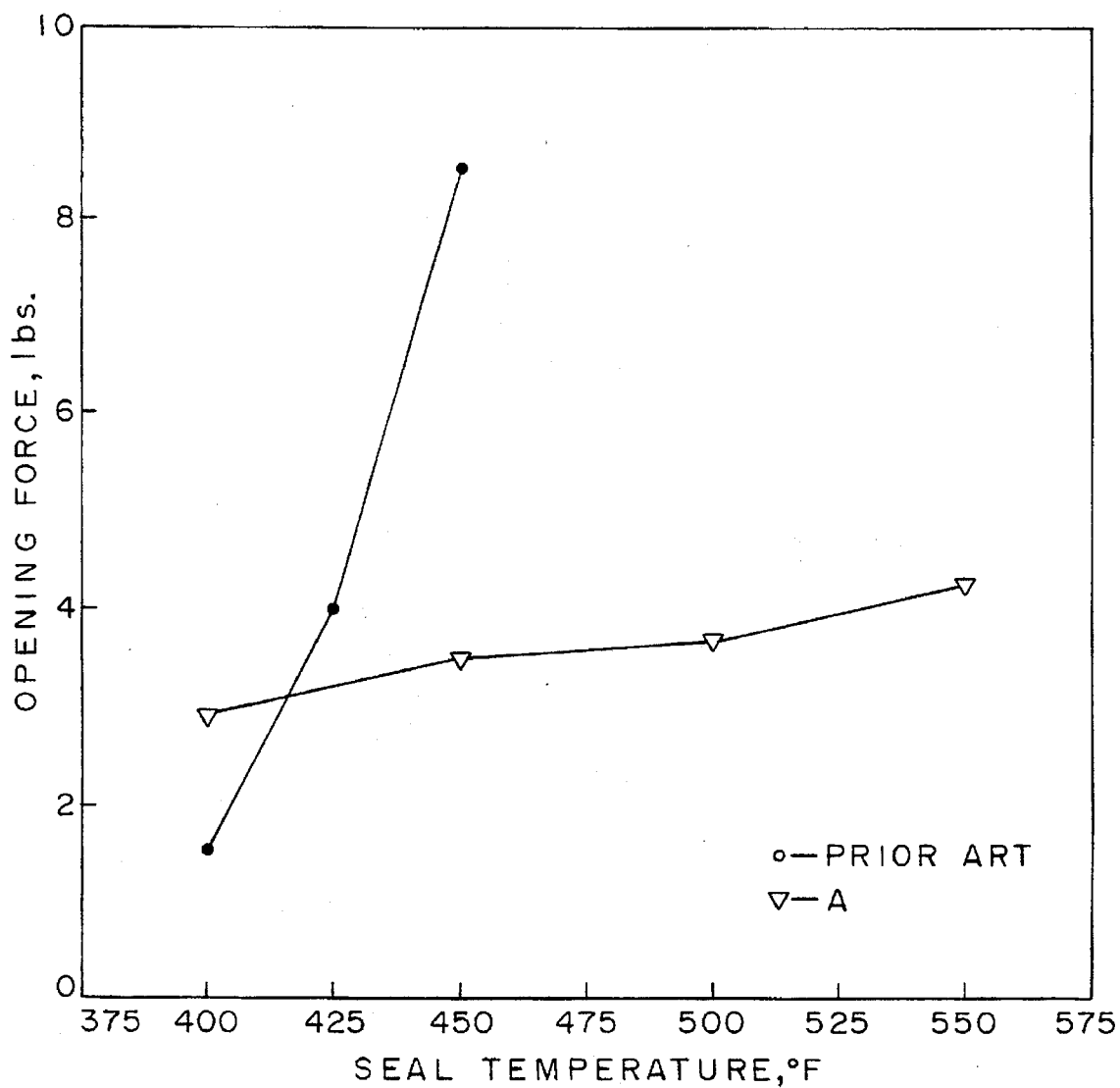
FIG. 6 is a graph showing opening force as a function of heat seal temperature.

Samples of lids heat sealed to 4 ounce polypropylene cups at 40 psi applied pressure for 0.6 seconds were also tested for burst pressure. Results are shown in FIG. 5. Sample B made in accordance with the present invention performed better than the prior art sample. Sample A was similar to the prior art sample in burst strength, even though sample A had lower peel strength than the prior art sample.

Samples of 4 ounce polypropylene cups were also sealed at 40 psi for 0.5 seconds with a contoured sealing head. Opening force for these samples as a function of heat seal temperature is plotted in FIG. 6. The prior art samples showed a much greater variation in opening force than sample A of the present invention.

The foregoing detailed description of my invention has been made with reference to some preferred embodiments. Persons skilled in the art will understand that various modifications can be made in the claimed lidstock material and food container without departing from the spirit and scope of the following claims.

What is claimed is:

1. A peelable and heat sealable lidstock material comprising a metal or polymer substrate laminated with a single layer film comprising:

a) about 30–70 wt. % of a butene-1 and ethylene copolymer wherein ethylene comprises about 1–15 mole percent of the copolymer, b) about 10–40 wt. % of an ethylene homopolymer or an ethylene-vinyl acetate copolymer or an ethylene-methyl acrylate copolymer, and c) at least about 18 wt. % of a particulate inorganic filler.

2. The lidstock material of claim 1 further comprising:

d) about 1–6 wt. % of a propylene homopolymer or copolymer.

3. The lidstock material of claim 1 wherein said inorganic filler comprises silica or talc.

4. The lidstock material of claim 1 wherein said film comprises about 20–30 wt. % talc.

5. The lidstock material of claim 4 wherein said talc is coated with about 0.5–5 wt. % (based on weight of the talc) of a carboxylic acid.

6. The lidstock material of claim 4 wherein the talc has an average particle size of about 0.5–10 microns.

7. The lidstock material of claim 1 wherein said film comprises:

a) about 30–60 wt. % of a butene-1 and ethylene copolymer wherein ethylene comprises about 2–10 mole percent of the copolymer, b) about 15–40 wt. % polyethylene, and c) about 20–30 wt. % talc having an average particle size of about 0.5–10 microns.

8. The lidstock material of claim 1 wherein said film comprises:

a) about 40 wt. % of the butene-1 and ethylene copolymer, b) about 35 wt. % polyethylene, and c) about 25 wt. % talc.

9. The lidstock material of claim 1 wherein said substrate comprises aluminum foil.

10. A lid for a plastic container comprising a disc of the lidstock material of claim 9.

11. A container comprising:

a) a plastic body having an upper edge defining an opening and a peripheral flange extending radially outward of said opening, and b) a lid comprising a metal or polymer substrate heat sealed to said upper edge by a single layer film comprising:

1) about 30–70 wt. % of a butene-1 and ethylene copolymer wherein ethylene comprises about 1–15 mole percent of the copolymer, 2) about 10–40 wt. % of an ethylene homopolymer or an ethylene-vinyl acetate copolymer or an ethylene-methyl acrylate copolymer, and 3) at least about 18 wt. % of a particulate inorganic filler.

12. The container of claim 11 wherein said body comprises polypropylene.

13. The container of claim 11 wherein said substrate comprises aluminum foil.

14. The container of claim 11 wherein said filler comprises about 20–30 wt. % talc.

15. The container of claim 11 wherein said inorganic filler is selected from the group consisting of talc, silica and alumina.

* * * * *

UNITED STATES PATENT AND TRADEMARK OFFICE
CERTIFICATE OF CORRECTION

PATENT NO. : 5,626,929
DATED : May 6, 1997
INVENTOR(S) : James A. Stevenson

It is certified that error appears in the above-indentified patent and that said Letters Patent is hereby corrected as shown below:

| | |
|---|---|
| Col. 4, lines 32-33 | Before "single layer", insert --heat sealable,--. |
| Col. 4, line 40 | After "acrylate copolymer", delete "and". |
| Col. 4, line 41 | After "filler", delete "." and insert therefor --, and optionally<br>    d) about 1-6 wt.% of a polypropylene homopolymer or copolymer wherein the weight percentages of the a, b, c, and d components are based on the total weight of the heat sealable, single layer film.-- |
| Col. 4, line 41, before | "particulate" insert --peelability enhancing,-- |
| Col. 5, line 12 | Before "single layer", insert --heat sealable,--. |
| Col. 5, line 16 | After "copolymer", delete "." and insert therefor --,--. |
| Col. 6, line 3 | After "copolymer", delete "and". |
| Col. 6, line 4 | Before "particulate", insert --peelability enhancing,--. |

UNITED STATES PATENT AND TRADEMARK OFFICE
CERTIFICATE OF CORRECTION

PATENT NO. : 5,626,929
DATED : May 6, 1997
INVENTOR(S) : James A. Stevenson

It is certified that error appears in the above-indentified patent and that said Letters Patent is hereby corrected as shown below:

Col. 6, line 5     After "filler", delete "." and insert therefor
--, and optionally
    4) about 1-6 wt.% of a polypropylene homopolymer or copolymer wherein the weight percentages are based on the total weight of the heat sealable, single layer film.--

Signed and Sealed this

Fourteenth Day of October, 1997

*Attest:*

BRUCE LEHMAN

*Attesting Officer*     *Commissioner of Patents and Trademarks*